United States Patent
Hatsutori et al.

(10) Patent No.: US 11,012,844 B2
(45) Date of Patent: *May 18, 2021

(54) PEER-TO-PEER EMERGENCY COMMUNICATION USING PUBLIC BROADCASTING

(71) Applicant: INTERNATIONAL BUSINESS MACHINES CORPORATION, Armonk, NY (US)

(72) Inventors: Yoichi Hatsutori, Tokyo (JP); Futoshi Iwama, Kanagawa-ken (JP); Kohichi Kamijoh, Kanagawa-ken (JP); Yuichi Nakamura, Kanagawa-ken (JP); Hitomi Takahashi, Tokyo (JP); Hironori Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,905

(22) Filed: Jul. 19, 2018

(65) Prior Publication Data
US 2018/0352409 A1    Dec. 6, 2018

Related U.S. Application Data

(63) Continuation of application No. 15/608,546, filed on May 30, 2017, now Pat. No. 10,070,297, which is a
(Continued)

(51) Int. Cl.
*H04B 7/00* (2006.01)
*H04W 4/90* (2018.01)
(Continued)

(52) U.S. Cl.
CPC ........... *H04W 4/90* (2018.02); *G06K 7/1417* (2013.01); *G06K 19/06037* (2013.01);
(Continued)

(58) Field of Classification Search
CPC .... G06F 16/9554; G06F 17/00; G06F 3/0484; H04M 2242/04; H04M 15/68;
(Continued)

(56) References Cited

U.S. PATENT DOCUMENTS 7,441,706 B1 * 10/2008 Schuessler .......... G06F 16/9554
235/462.15
2007/0138286 A1 * 6/2007 Kamijoh .......... G06K 19/06037
235/462.04
(Continued)

FOREIGN PATENT DOCUMENTS

| JP | 2010246003 A | 10/2010 |
| JP | 2011055287 A | 3/2011 |
| JP | 4778455 B2 | 9/2011 |

*Primary Examiner* — Golam Sorowar
(74) *Attorney, Agent, or Firm* — Tutunjian & Bitetto, P.C.; Kurt Goudy

(57) ABSTRACT

A method for emergency communication includes encoding a message for visual display including a message to field and a message from field. The visual display is revealed to a reading device in communication with a broadcast center, which stores the visual display. The messages are decoded and sorted from visual displays at the broadcast center. On an index channel, a time and channel number for when a message body of the message will be broadcast on a message channel is broadcasted. The message body is broadcasted on the message channel.

20 Claims, 7 Drawing Sheets

Related U.S. Application Data continuation of application No. 15/357,314, filed on Nov. 21, 2016, now Pat. No. 10,171,981, which is a continuation of application No. 13/851,672, filed on Mar. 27, 2013, now Pat. No. 9,590,752.

(51) Int. Cl.

| | | |
|---|---|---|
| *H04H 20/59* | (2008.01) | |
| *H04L 12/58* | (2006.01) | |
| *H04L 29/08* | (2006.01) | |
| *H04L 12/18* | (2006.01) | |
| *H04W 4/06* | (2009.01) | |
| *H04H 60/15* | (2008.01) | |
| *G06K 7/14* | (2006.01) | |
| *G06K 19/06* | (2006.01) | |
| *H04W 76/50* | (2018.01) | |
| *H04W 76/14* | (2018.01) | |
| *H04M 11/04* | (2006.01) | |
| *H04W 4/08* | (2009.01) | |
| *H04W 8/08* | (2009.01) | |
| *H04W 88/06* | (2009.01) | |
| *H04L 29/06* | (2006.01) | |

(52) U.S. Cl.
CPC .......... *H04H 20/59* (2013.01); *H04H 60/15* (2013.01); *H04L 12/18* (2013.01); *H04L 12/1895* (2013.01); *H04L 51/066* (2013.01); *H04L 67/325* (2013.01); *H04M 11/04* (2013.01); *H04W 4/06* (2013.01); *H04W 4/08* (2013.01); *H04W 8/085* (2013.01); *H04W 76/14* (2018.02); *H04W 76/50* (2018.02); *H04W 88/06* (2013.01); *H04L 69/04* (2013.01)

(58) Field of Classification Search
CPC .. H04M 17/00; H04M 17/02; H04M 1/72505; H04M 1/72544; H04M 1/72547; H04M 2017/25; H04M 2017/2506; H04M 2017/2537; H04M 2017/2556; H04M 2017/2568; H04M 2207/18; H04M 2215/0196; H04M 2242/30; H04M 3/2218; H04M 3/2281; H04M 3/42357; H04M 3/5116; H04N 21/4223; H04N 21/44008; H04N 21/6581; H04N 21/8126; H04N 21/23418; H04N 21/236; H04N 21/23892; H04N 21/2665; H04N 21/41407; H04N 21/4227; H04N 21/47202; H04N 21/4722; H04N 21/47815; H04N 21/6582; H04N 21/812; H04N 21/8146; H04N 21/8153; H04N 21/8352; H04N 21/8586; H04N 7/17336; H04W 4/023; H04W 4/06; H04W 4/90; H04W 48/04; H04W 48/14; H04W 4/026; H04W 4/027; H04W 4/16; H04W 4/24; H04W 64/00; H04W 76/50; H04W 84/025; H04W 8/22

See application file for complete search history.

(56) References Cited

U.S. PATENT DOCUMENTS

| | | | |
|---|---|---|---|
| 2008/0217392 A1* | 9/2008 | Weiner | G06K 7/14 235/375 |
| 2009/0083808 A1* | 3/2009 | Morrison | H04N 7/17336 725/87 |
| 2010/0088316 A1* | 4/2010 | Robinson | H04L 67/2847 707/737 |
| 2011/0087539 A1* | 4/2011 | Rubinstein | G06Q 30/02 705/14.41 |
| 2011/0117874 A1* | 5/2011 | Shaw | G08B 27/006 455/404.1 |
| 2011/0210170 A1* | 9/2011 | Arguello | G06Q 30/02 235/380 |
| 2011/0234829 A1* | 9/2011 | Gagvani | H04N 5/232 348/222.1 |
| 2012/0272279 A1* | 10/2012 | Lim | H04N 21/23892 725/109 |
| 2012/0323699 A1* | 12/2012 | Phillips | G06Q 30/02 705/14.69 |

\* cited by examiner

PEER-TO-PEER EMERGENCY COMMUNICATION USING PUBLIC BROADCASTING

BACKGROUND

Technical Field

The present invention relates to emergency communication, and more particularly to systems and methods to enable emergency communications when normal communication networks are down due to a disaster or the like.

Description of the Related Art

During or after a natural disaster, message exchanges to inquire about the safety of family, friends, and so on via e-mail or voice using mobile devices may be impossible due to damage of base stations and/or power failure. Landline phones are relatively more robust against a disaster, but there is a high likelihood that congestion issues will limit their usefulness. Even in such circumstances, public broadcasting systems (terrestrial, BS, CS, etc.) are active as well as satellites. However, the volume and size of the messages exchanged becomes a problem even for these systems.

SUMMARY

A method for emergency communication includes encoding a message for visual display including a message-to field and a message-from field. The visual display is revealed to a reading device in communication with a broadcast center, which stores the visual display. The messages are decoded and sorted from visual displays at the broadcast center. On an index channel, a time and channel number for when a message body of the message will be broadcast on a message channel is broadcasted. The message body is broadcasted on the message channel.

A method for emergency communication includes encoding a message for visual display including a message to field and a message from field; revealing the visual display to a reading device in communication with a broadcast center which stores the visual display; decoding and sorting the messages from one or more visual displays at the broadcast center; on an index channel, broadcasting a time and channel number for when a message body of the message will be broadcast on a message channel; broadcasting the message body on the message channel; scanning the index channel to learn when to tune in to the message channel to receive the message; and tuning to the message channel at a designated time to receive the message.

A system for emergency communication includes a message encoder configured to encode a message from a sending device and an encoded message device configured to display a message with a message to field and a message from field as a visual display. A reading device is configured to read the visual display. A broadcast center is configured to receive and store the visual display uploaded by the reading device, the broadcast center is also configured to decode visual displays back to messages and sort the messages from one or more visual displays to broadcast the messages on an index channel and a message channel. The index channel includes a time and channel number for when a message body of the message will be broadcast on the message channel, and the message body is broadcast on the message channel at the allocated time and channel designation such that the messages can be received during emergency conditions when telephone network communications are down.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Figure 1:
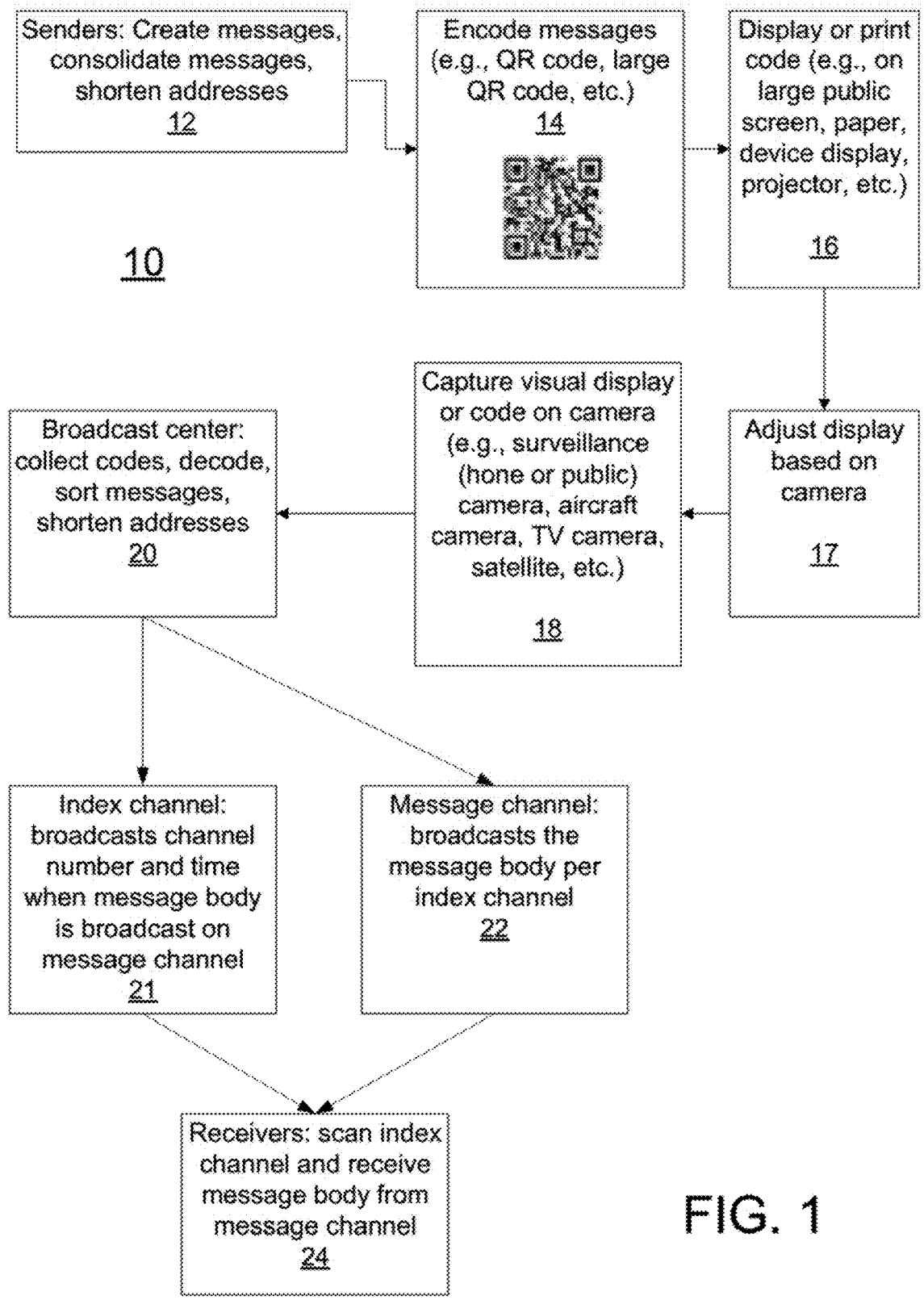
FIG. 1 is a block/flow diagram showing a system/method for processing messages during an emergency condition in accordance with the present principles.

In accordance with the present principles, peer-to-peer communications are enabled under disaster or emergency conditions. Peer-to-peer communications under circumstances where no communication would otherwise be possible are provided via e-mail or voice using mobile devices or landline phones using public broadcasting service or satellite systems. Message senders may have mobile devices equipped with a One Seg (1Seg) receiver and code encoder, such as a quick response (QR) code encoder (hereafter QR code).

The core standards of Integrated Services Digital Broadcasting (ISDB) are ISDB-S (satellite television), ISDB-T (terrestrial), ISDB-C (cable) and 2.6 GHz band (B) mobile broadcasting which are all based on MPEG-2 or MPEG-4 standard for multiplexing with transport stream structure and video and audio coding (MPEG-2 or H.264), and are capable of high definition television (HDTV) and standard definition television. ISDB-T and ISDB-Tsb are for mobile reception in TV bands. One Seg is the name of an ISDB-T service for reception on cell phones, laptop computers and vehicles. The concept was named for its similarity to Integrated Services Digital Network (ISDN) in the US, because both allow multiple channels of data to be transmitted together (multiplexing).

In accordance with the present embodiments, message senders use their mobile phone or landline device to convert a message to exchange to QR code, and have a code image taken by a closest public camera, e.g., a surveillance camera, TV camera, large screen camera, satellite camera, home network camera, etc. In case the code is too small to be resolved, the codes can be enlarged in accordance with a resolution of a given camera. A plurality of people in an area may send collective or consolidated messages; such messages can be gathered and sent effectively as one QR code.

The photo of code taken can be consolidated at or for a broadcasting center, and classified by a destination of the mobile phone companies. The broadcasting center first sends index information to an index channel to inform of the channel number and time for the message body (on a message channel), then sends the message to the message channel specified by the index channel. The message is transmitted using One Seg (MPEG), and the message is received from the senders. By reducing the size of addresses of "from" and "to", and by using the index channel exclusively for the data of index to the message information, the present principles are enabled to send the information to receivers which cannot be achieved solely by sending all the messages to One Seg service. By limiting the area of the broadcast by knowing the area of the "to" address, the messages can be effectively broadcast, avoiding broadcasting messages where receivers do not exist.

In particularly useful embodiments, a method to enable peer-to-peer (p2p) message exchange in an environment, where multiple terminal devices and a broadcasting center are included, sends messages to devices by a one way broadcasting channel from the broadcasting center to each device, and a service to upload images from the message senders to the broadcasting center. The message sender converts visible code including a message body, a sender ID, and a receiver IDs. Captured visible code is received by the broadcasting center via a channel to upload the codes. The broadcasting center decodes the visible code, extracts receiver IDs and messages, and creates index information which includes time and channel number for a second broadcast channel (i.e., a message channel). The broadcasting center broadcasts the index information to a first channel (i.e., index channel). A message receiver's device is always receiving the first channel information, and if the receiver receives an ID which is same as their ID, the receiver extracts the time and channel number of the second broadcast channel. The receiver's device is automatically tuned to the second channel known from the index channel, and obtains the message sent to the receiver. The code is not restricted to visible code, but visible code is preferred since it is more universally employed with common camera devices.

Locations of the receiver's devices may be specified based on the history of the past message exchanges, and the index information and message information may be broadcasted only to areas, which include the specified area where the receiver's devices exist. IDs of senders and receivers may be shortened by indexing before visible codes are created.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a block/flow diagram shows a communication system 10, which employs available resources in disaster and/or emergency scenarios. In disaster scenarios, mobile phone and internet service is not available. However, communication resources may still be available. These may include surveillance cameras, public broadcasting services, such as TV and radio, and satellite services. Also, powered mobile phones and handheld devices, senders 12, may be equipped with resources that can enable emergency communication. These resources may include cameras and barcode readers/encoders, etc. While many symbols, which can be digitally rendered or physically written (handwritten) may be employed, the present principles with be described in terms of bar coding or QR coding of textual messages for simplicity. Any messaging device 12 may include but is not limited to phones, handheld computers or any other portable computing device having a display. A sender 12 encodes a message to QR code off-line. The message may include any text message or message code. The message is converted to a bar code or QR code using an encoding application 14, which may be stored on the sender's device 12. The encoded message is displayed on a display device or mechanism 16, such as computer screen, public screen or monitor, a phone screen, a mobile phone screen, on a printed out piece of paper, on a projection device, etc. The encoded message may include an adjusted resolution 17 to be viewable by one or more image readers for various reading modalities. For example, the encoded message may include a black and white QR code, an enlarged QR code, a bar code or other readable encoding.

A reading device 18 reads the displays visual code. In one embodiment, the encoded message can be uploaded by satellites or other equipment. In one embodiment, message encodings are read by satellite. For example, a given area may be designated for satellite upload, and encoded messages may be presented as the designated location for uploading by one or more senders. Satellites can recognize encodings of about 50 cm on the ground. Messages can be presented as large size QR encodings, for example, the size of 41×41 QR code (1088 bit) will be 20.5 m×20.5 m with 50 cm per cell. Other methods are also contemplated. See, e.g., FIG. 5.

The encoded message 14 is displayed as an image (16) and can be read or captured by the reading device 18. The reading device 18 is a device or system that remains operational during the disaster or emergency. The reading device 18 may include, e.g., a satellite, aircraft, helicopter, surveillance camera, television camera, etc. or other reading devices available under power failure. The reading device 18 can take a photo or otherwise scan the encoded message for delivery to a broadcast center 20. In one embodiment, an application may be employed to identify locations on a map, such as surveillance cameras or convenience stores, shelters, etc. where a camera or reading device 18 is located for uploading messages. The location data/maps may be broadcast by the broadcast center 20.

The broadcast center 20 receives and decodes the encoded messages and sorts the messages based the "To" information in the messages. To avoid long message addresses (both To and From), the addresses may be shortened within a limit where senders and receivers can still be correctly identified (short mail address). Messages are collected at the broadcast center 20, and the center 20 sends a time and channel number where the message bodies will be broadcasted to an index channel 21. The messages are then broadcasted on a message channel in block 22. The broadcast center 20 bundles the messages and specifies the channel and times of when message bodies from a given area or group will be broadcast. This reduces the number or amount of broadcast bandwidth needed to effectively broadcast all messages.

Receivers 24 can receive index information from the index channel 21 using applications, such as One Seg or a digital terrestrial service, and then receive the message body from the message channel 22 whose channel number and time are specified from the index channel 21. For example, if messages from a given region are to be broadcast on channel 1 at 12 PM, this information is broadcast over the index channel 21 and may be constantly streamed. Then, receivers 24 can receive message bodies over the message channel 22 from channel 1 at 12 PM for that region or other bundling group. The receivers 24 will automatically associate their address to the information in the index channel 21, and accordingly listen at the correct channel and time to pick up the message body from the message channel 22. Even in the case of power failure, terrestrial service can be received by using self-power generation or a BS-antenna. The receivers 24 may include any handheld device, computer or other communication device capable of receiving messages.

From the message channel 22, the receivers 24 can ignore the messages if the "from" address does not match any of the short addresses calculated from his/her device (e.g., telephone) directory. The center 20 specifies the area of the receivers 24 based on recent history of who sent messages, and broadcasts messages only to areas where the receivers 24 may exist (To/From matching). By limiting the broadcasting area based on the history of recent past message exchanges, unnecessary broadcasting can be avoided, and message delivery speed can be increased. For example, by dividing Japan into 10 regions, e.g., Hokkaido, Tohoku, Kanto, Koshinetsu, Chubu, Kansai, Chugoku, Shikoku, Kyushu, and Okinawa, if a destination area can be specified, a number of messages to be broadcasted can be reduced to $\frac{1}{10}$ using to/from matching.

This enables peer-to-peer (p2p) communication even if mobile phones, landline phones, and the internet become unavailable during a disaster using public broadcasting services or the like. The present principles make best use of the infrastructure, and enable p2p communication during disasters.

Figure 2:
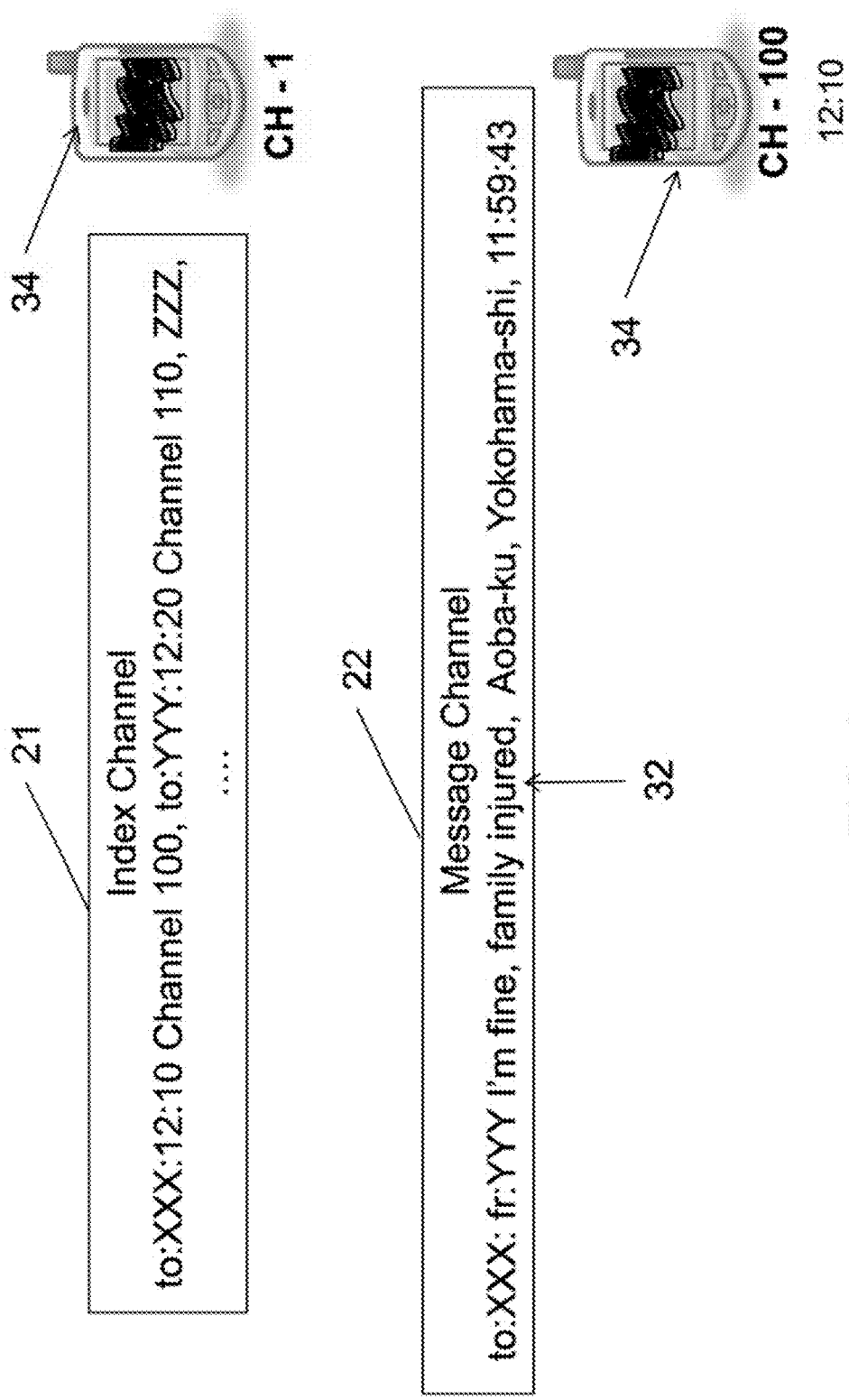
FIG. 2 is a block diagram showing illustrative content supplied over an index channel and a message channel in accordance with the present principles.

Referring to FIG. 2, a transmission from a sender (12) over the index channel 21 and the message channel 22 are shown in accordance with one illustrative example. The sender YYY sends a message to XXX. The index channel 21 decodes the sender's initial message and employs an application, e.g., One Seg to decode the message from an MPEG format, to find XXX information in the message. A channel number and message time are obtained for broadcasting of a message body 32 by receiver 34. In this example, the message body 32 will be broadcast on channel 100 at time 12:10. A receiver device 34 tunes One Seg to CH-100 at 12:10, finds XXX and receives the message body 32 using, e.g., an MPEG format, although other formats may be employed. The message can be automatically received using an application set up to listen to relevant messages.

The message channel 22 broadcasts the message bodies associated with the appropriate to/from data. The One Seg application tunes to Ch-100 at 12:10 to look for and receive the message body to XXX. Location and time of the sender's message can be received from the sender's device and may preferably be transmitted with the body of the message.

Here, the sender is identified as YYY, and the message body includes "I'm fine, family injured, Aoba-ku, Yokohama-shi, 11:59:43".

Message formatting and content compression are considerations for high congestion time periods. During a disaster, many messages may be needed to be broadcast over a single link or network since regular networks may be down. Therefore, short mail or message address formatting is preferred. In one embodiment, the length of a sender's address may be reduced and privacy may also be preserved. To reduce the length of the address both "To" and "From" addresses may be converted to adr_N, with N bits. Mail addresses of mobile phones tend to be long, e.g., js19nut3gcj6i1t5bid2=106 bits. The addresses can be converted by, e.g.:

Convert address_i to Nbit adr_Ni adr_Ni=lsb(hash(address_i),N), where lsb is the least significant bit.

To maintain privacy, the message itself may be encrypted by a public key of the receiver. To send an encrypted message to more than one receiver, a message encryption key (Kt), which encrypts (Enc) the message body (body) can be encrypted by the public key (PK) of the respective receivers, e.g.:

From: adr_N1 To:adr_N2, adr_N3, Enc(PK_2,Kt),Enc(PK_3,Kt),Enc(Kt,body)

Figure 3:
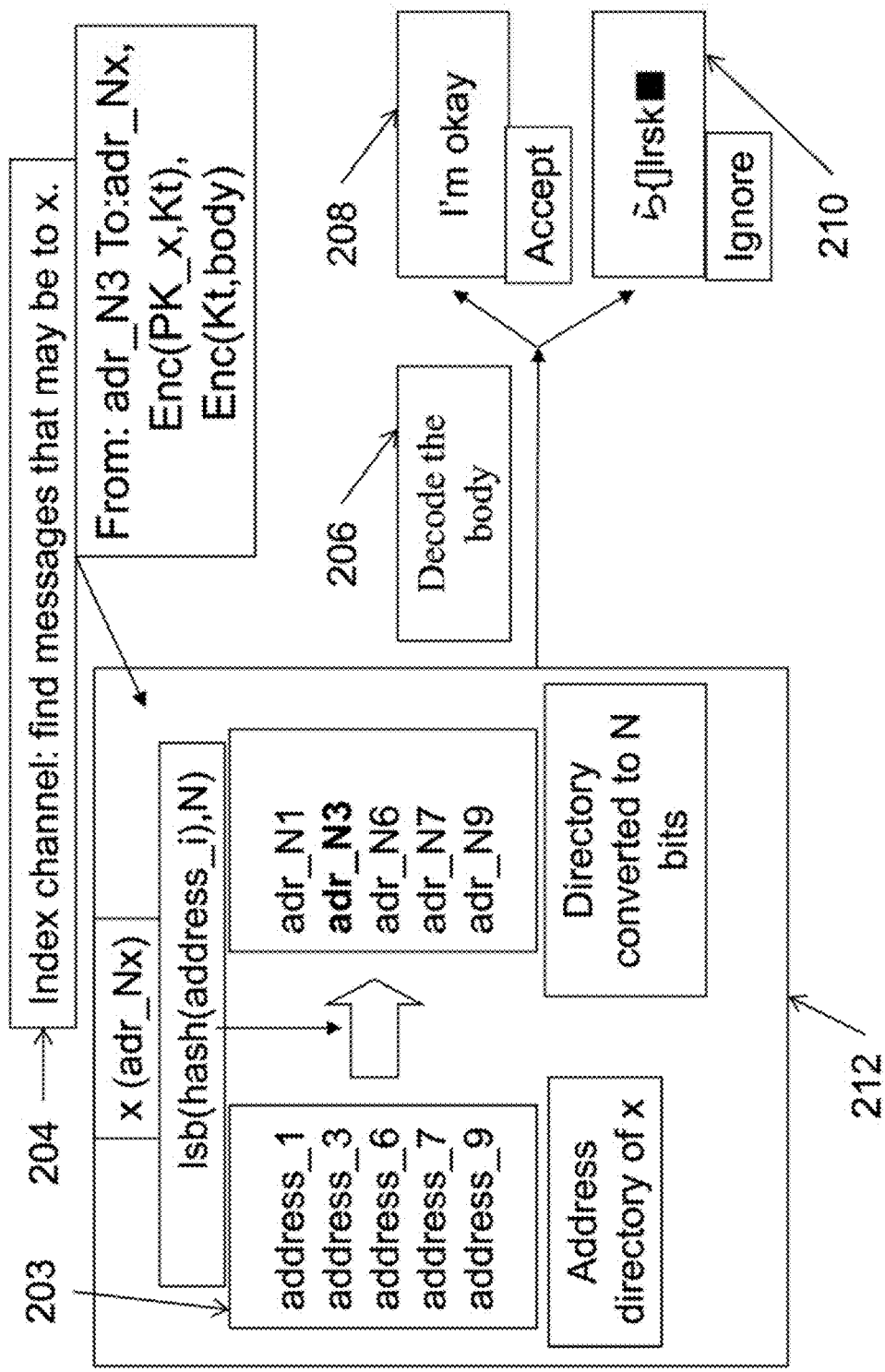
FIG. 3 is a block diagram showing address indexing to reduce or compress data and to provide message privacy in accordance with the present principles.

Referring to FIG. 3, short addresses may include preserved privacy at the receiver, as follows. First, adr_Nx is calculated from the receiver's address x in block 212. Then, calculate {adr_Ni}, i=1, . . . , M from x's address directory 203 in advance, where M is the number of users registered in x's address directory 203. In the index channel in block 204, if x finds adr_Nx in a "To" address and finds one of {adr_Ni} in the "From" address as in block 207, x decodes the body in the message channel 206. If the decoded message does make sense, x receives the message as mail in block 208. Otherwise, the message may be ignored in block 210. If ignored, steps may be taken to resend, reencrypt or alert the sender that the message was not received.

In another embodiment, "A" persons may simultaneously send messages to two, e.g., each of A persons registers B persons in his/her message address directory. If a length of the address is converted to N bits, p, the probability of decoding mails which make sense as messages that are not intended for a receiver (by mistake) is as follows, where q is a probability that an encrypted messages makes sense when decrypted by an incorrect key:

$p=1-(1-(1-2-N)B)q)^{2.42^N}$.

p2 is the probability that all of A persons do not decode incorrect messages.

$p2=(1-p)^A$.

In one example, if $A=10^6$, B=100, q=0.01, the minimum N that makes p2<0.5 is N=21. By making the length of address=21 bits, messages can be sent without decoding messages not intended for a given receiver. This provides a broadcast center the ability to reduce the address size to increase throughput or increase address size to increase privacy. The length of address can be dynamically changed based on A, B and q, and the address length can be set and controlled by the broadcast center. While the example demonstrates that ability to control throughput and increase efficiency and/or privacy, other encryption and encode/decode methods may be employed.

Figure 4:
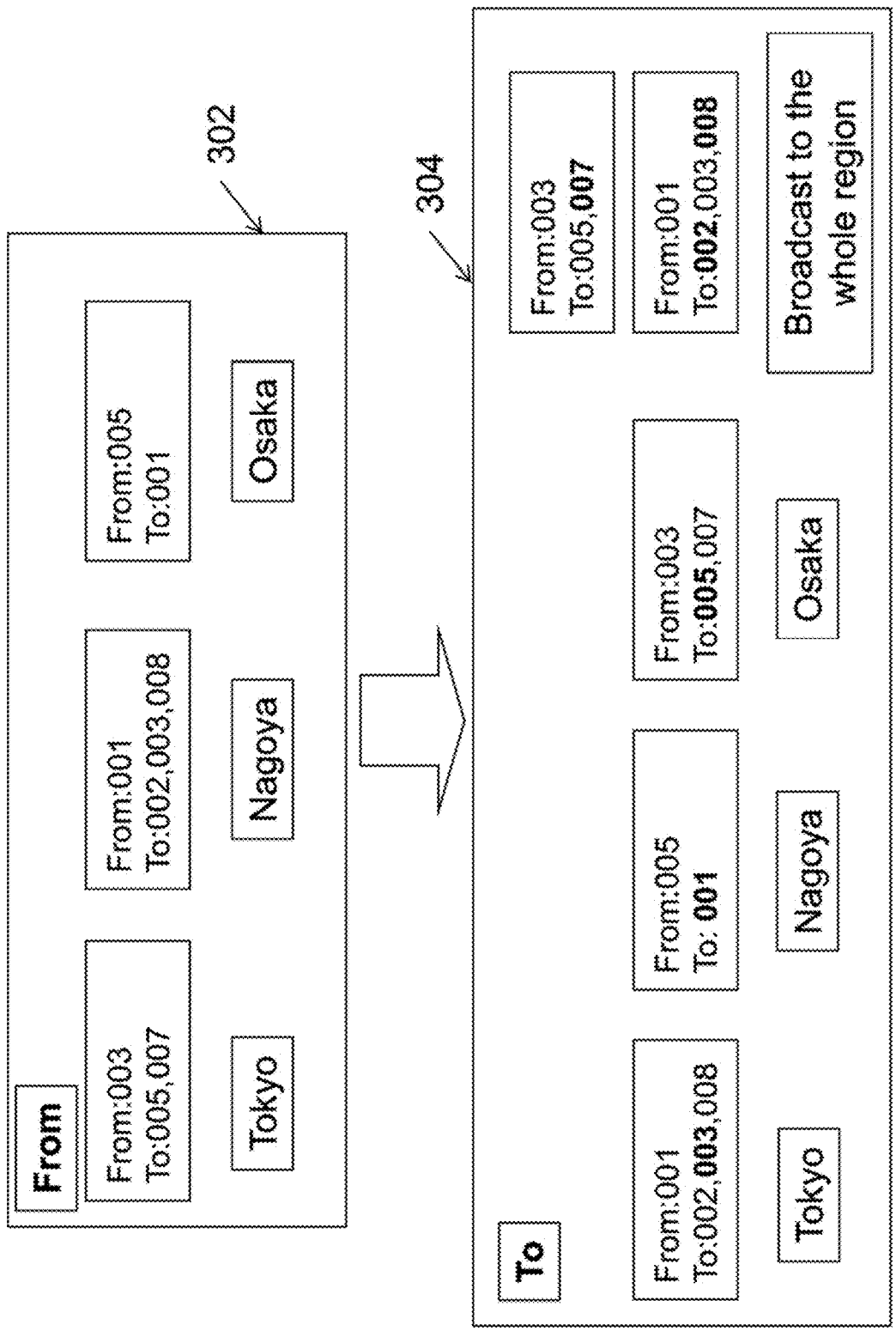
FIG. 4 is a block diagram showing an illustrative example of to/from matching in accordance with the present principles.

Referring to FIG. 4, an illustrative example of to/from matching is illustratively described in accordance with the present principles. The broadcast center stores messages received and can match message-to and message-from fields to appropriately route the messages. Assume, for this example, that a sender 001 does not know where persons he/she is trying to contact are located ("To" location). If messages are received from "From" persons in the broadcast center and someone is sending mails to the "To" persons, the messages are sent only to the area where "To" persons exist. Thus, messages are not sent where receives do not exist. This enables other messages to be delivered faster.

In block 302, messages are received from Tokyo (from: 003 to: 005, 007); Nagoya (from: 001, to: 002, 003, 008); and Osaka (from: 005, to: 001) for broadcast. In block 304, to/from matching is performed to route the messages efficiently. Since a message was received from 003 in Tokyo, the assumption is that 003 can receive messages in Tokyo so the message from Nagoya in block 302 ("to" lists 003) is routed to Tokyo in block 304. Similarly, the message from Osaka in block 302 is from 005 and is routed to Nagoya in block 304 where 001 has sent a message in block 302. The message from Toyko to 005 is routed to Osaka in block 304 where sender 005 has sent a message from. Since there was no "from" messages by 002, 007, and 008, these messages can be broadcast to the whole country or other designated area or region.

Figure 5:
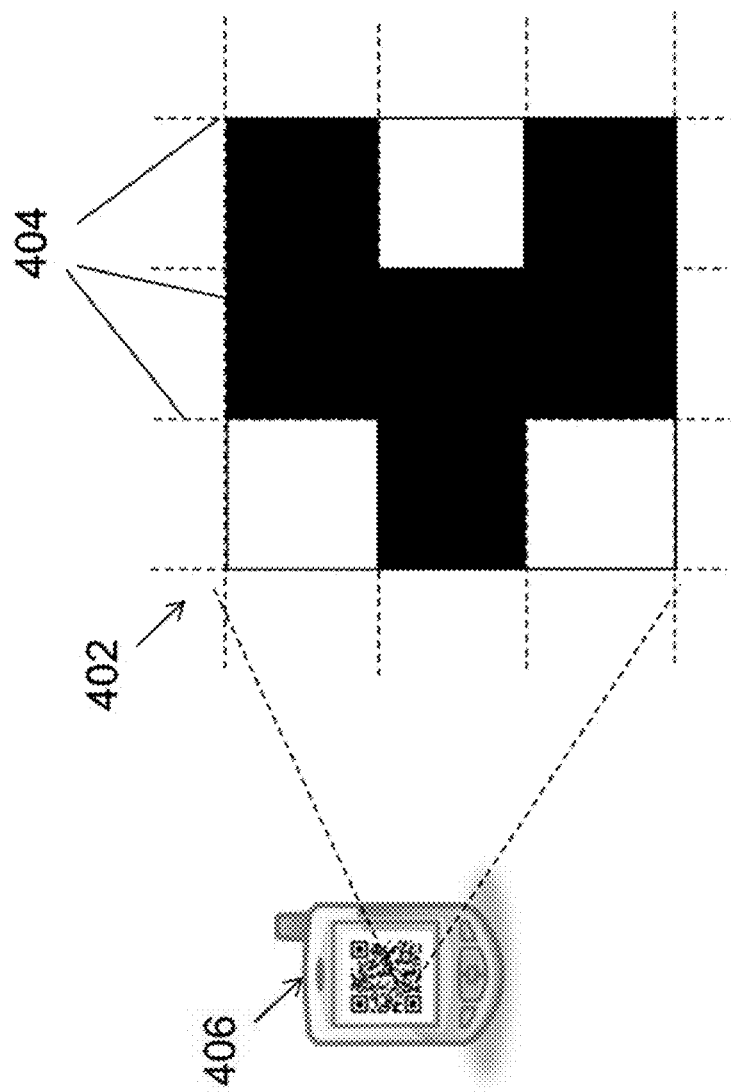
FIG. 5 is a diagram showing an illustrative example of large quick response code for satellite and other cameras in accordance with the present principles.

Referring to FIG. 5, sending messages using large QR code may take advantage of satellite uploading (or uploading to other camera devices) to broadcast emergency messages. Large QR code 402 may be presented in large black and white grids 404 so that its photo can be taken by satellite. A large QR code 402 may be created by clipping parts from a paper, or affixing squares to paper as parts of the QR code. The parts are preferably black and white to create contrast for the large QR code, although other color combinations may be employed. In another embodiment, the code may be created on a device 406 and projected or uploaded to a screen or other device configured to provide the proper resolution for reading the large QR symbols.

In other embodiments, a projector may be employed to enlarge QR code 402 and to display the code on the ground, the roof of the projectors, mountains, or ocean, etc. While high contrast visible light is being described, other forms of radiation may be employed, e.g. laser light, non-visible light, etc. In still other embodiments, sequential QR code may be employed, e.g., display the large QR code using a PC or field of PCs or sequentially transmit data with a known interval between pulses or signals. In emergency situations, the large QR code paper or system may be set up in advance, e.g., in schools, shelters, hospitals, public offices, etc. Satellites can recognize QR encodings of about 50 cm on the ground. Messages can be presented as large size QR encodings, for example, the size of 41×41 QR code (1088 bit) will be 20.5 m×20.5 m with 50 cm per cell. Other methods are also contemplated.

Figure 6:
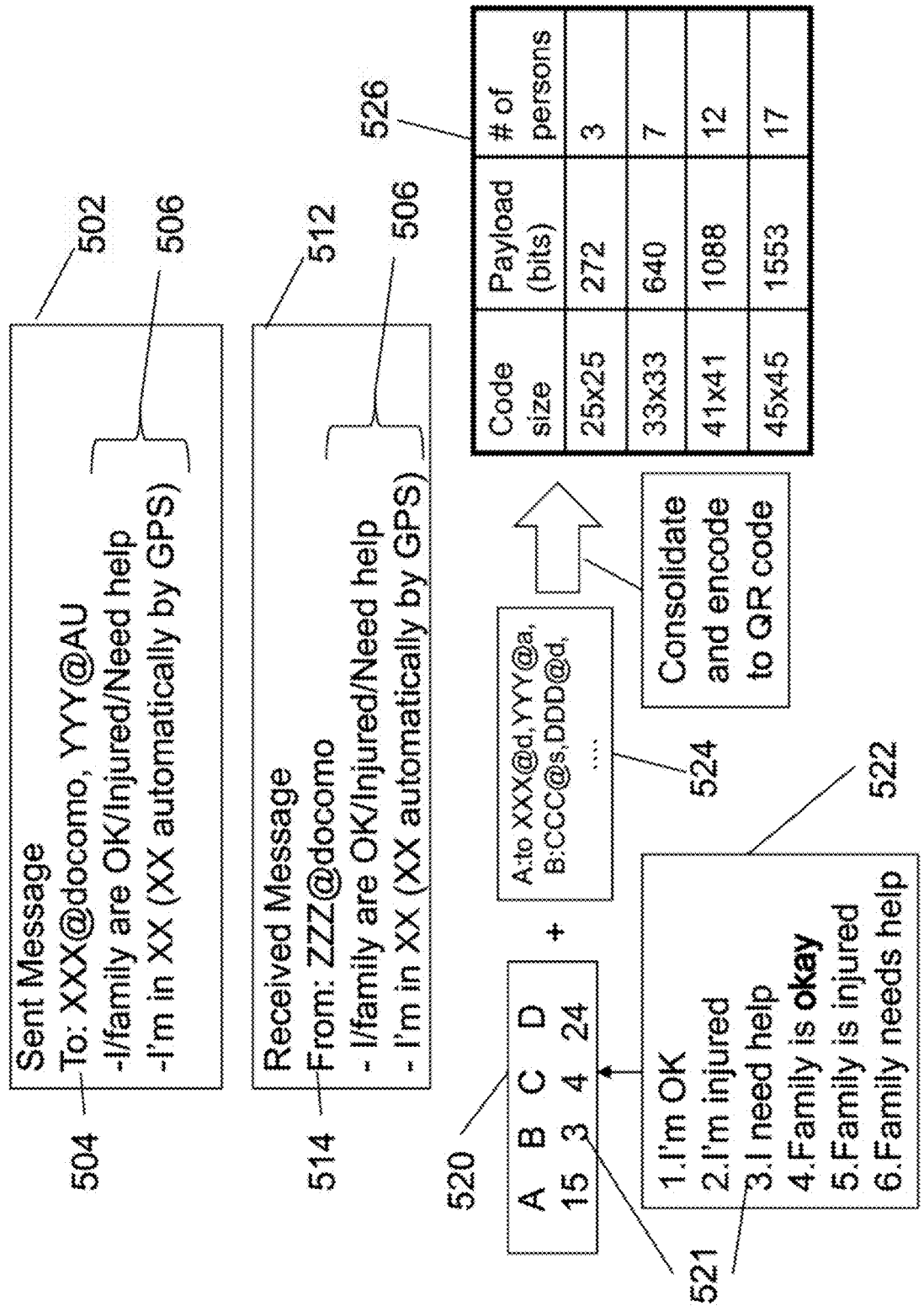
FIG. 6 is a block/flow diagram showing an illustrative example for large quick response encoding to consolidate a group of messages in accordance with the present principles.

Referring to FIG. 6, an illustrative example is described for employing large QR encoding to send or convey consolidated messages by ad-hoc communication in accordance with one embodiment. A common template for disasters may be employed where known messages are grouped together or consolidated. For example, in response to a disaster signal sent by the government an automatic function or application in each device may be enabled to employ QR encoding and an application that employs the common template.

A message 502 to be sent is depicted, which includes a "to" field 504 with a number of receivers (XXX, YYY, etc.) listed. The message 502 includes a message body 506, which if common template messages are employed, can be consolidated with other messages from other senders. Note that in the body of the message the template may insert the time and the location using, e.g., GPS or other means to automatically insert this data. A message 512 received is depicted, which includes a "from" field 514 with the sender listed (ZZZ). The message 512 includes the message body 506. The data of these and other messages to be sent or to be received can be consolidated and compressed to reduce payload of the ad-hoc communication system.

In block 520, messages from four senders A, B, C and D are consolidated. Each sender includes a message code 521 from a common template list 522. Multiple message codes 512 may be included, but preferably a single code should be employed. A consolidated send to routing list 524 is created including the consolidated messages. The consolidated messages and to/from lists are encoded, e.g., in large QR code. Using the common template messages, the "from" field may use 28 bits, the "to" field 56 may use 56 bits (for two people) and the message code may include 6 bits. The total would be 90N bits for N people to send messages. An example table 526 shows columns for a code size, payload and number of persons. The columns associate data so that the messages can be appropriately consolidated into a single QR code.

Figure 7:
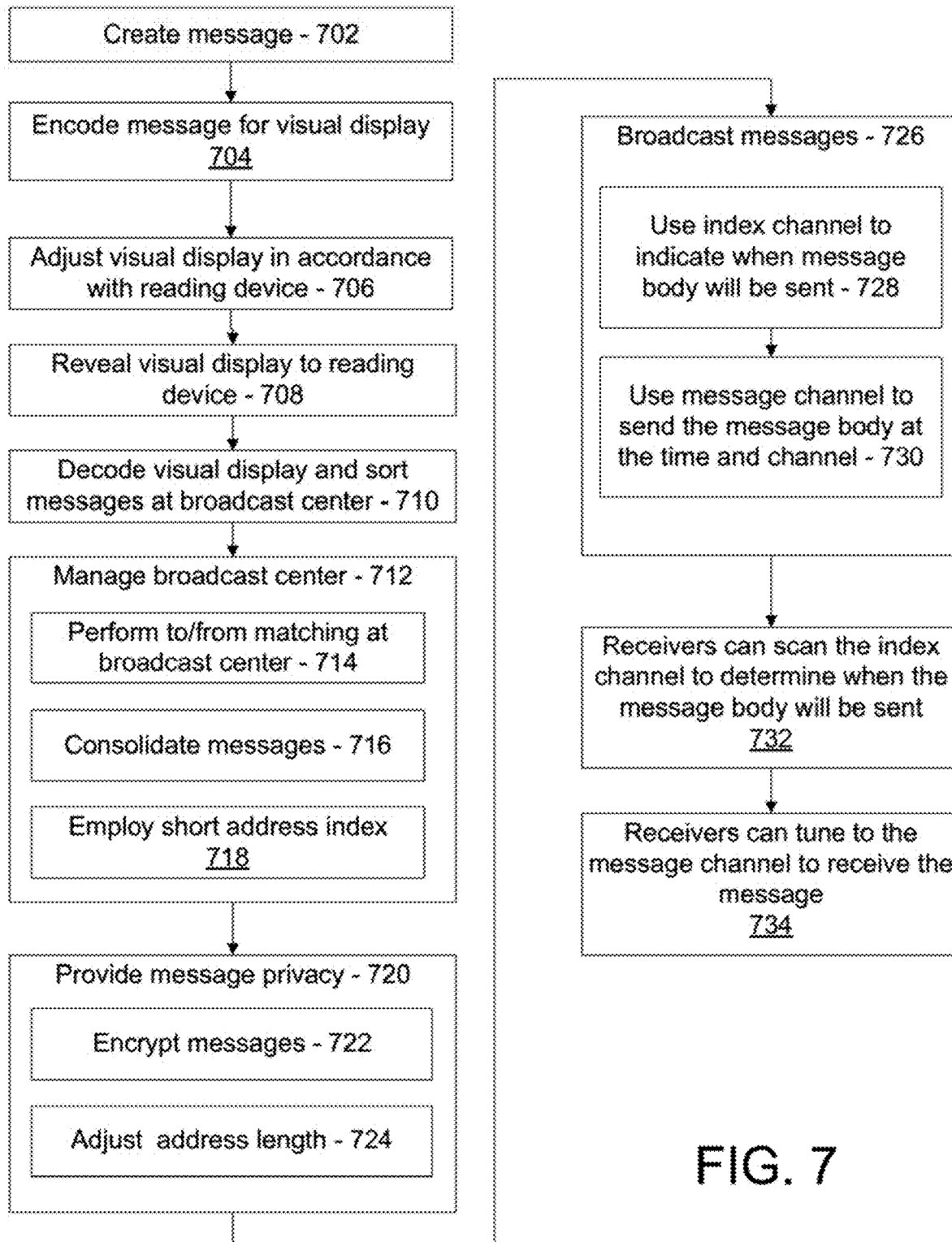
FIG. 7 is a block/flow diagram showing another system/method for processing messages during an emergency condition in accordance with the present principles.

Referring to FIG. 7, a method for emergency communication is shown in accordance with one illustrative embodiment. In block 702, a message is created with sender device, such as a telephone or other device. The device may include a portable or alternate energy source device to be operational during emergency conditions, such as without power or without a normally operating telecommunication network system. In block 704, the message is encoded for visual display including a message-to field and a message-from field. The message-from field may be automatically provided from the device. Encoding the message for visual display may include encoding the message in quick response (QR) code or other readable encoding. In block 706, the visual display of the message may have its resolution adjusted to accommodate a reading device. The visual display may include a paper image, a digital image, etc. to be captured by a reading device. The paper images may be configured with peal-away regions or adhesive sticking regions to manually create a message code output by a sender's device.

In block 708, the visual display is revealed to the reading device or devices in communication with a broadcast center which stores the visual display. The reading device may include a camera or scanner on one or more of a surveillance system, a satellite, an aircraft, a television broadcast camera, etc. The idea is to employ equipment that is available and operational under emergency conditions.

In block 710, the messages are decoded from one or more visual displays and sorted at the broadcast center. The broadcast center includes a network capable of operation during an emergency condition, and may include a television or radio network, a satellite network, a cable network, a cellular network, etc. or portions of these networks that remain available during an emergency condition.

In block 712, network management includes reducing bandwidth, traffic and power requirements. This may include one or more of the following.

In block 714, perform to/from matching of the messages to reduce network traffic. This includes collecting messages at the broadcast center and routing messages to areas that have revealed receivers based on previously sent messages by the receivers. In block 716, messages may be consolidated by using a common template message list and encoding a plurality of messages into a single encoding (visual display). In block 718, a short mail address may be created by compressing to/from information into an indexed address format.

In block 720, message privacy may be provided. In block 722, privacy may be provided by encrypting a message using a message key and a public key. This may include using public keys for each receiver to enable a single message to be distributed among a plurality of receivers. In block 724, privacy may be provided by adjusting a length of an address to ensure that the message will not be received by anyone other than the listed addressee.

In block 726, messages are broadcast by the broadcast center. In block 728, a time and channel number are broadcast on an index channel. The time and channel number indicate when a message body of the message will be broadcast on a message channel. In block 730, the message body is broadcast on the message channel at the designated time and channel assignment.

In block 732, receivers can scan the index channel to learn when to tune into the message channel to receive the message. In block 734, the message channel is tuned at a designated time to receive the message or messages. Return messages may be sent in a similar manner or in accordance with the available technology.

Having described preferred embodiments for peer-to-peer emergency communication using public broadcasting (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for emergency communication, comprising:
   a processor device coupled to a memory, the processor being configured for revealing a visual display, from a message encoded for visual display, to a reading device in communication with a broadcast center which stores the visual display;
   a second processor device coupled to a second memory, the second processor being configured for:
   decoding and sorting messages from one or more visual displays at the broadcast center by collecting messages at the broadcast center and routing messages to revealed receivers; and
   broadcasting the message on a message channel, the message channel being configured to send the message to the revealed receivers for display using visible and non-visible light.

2. The system as recited in claim 1, wherein the processor is further configured for encoding the message for visual display including a message-to field and a message-from field.

3. The system as recited in claim 1, wherein the processor is further configured for broadcasting, on an index channel, a time and channel number for when the body of the message will be broadcast on the message channel.

4. The system as recited in claim 1, wherein the processor is further configured for encoding the message for visual display by encoding the message in quick response code.

5. The system as recited in claim 1, wherein the revealing the message encoded for visual display to a reading device includes displaying the visual display to a camera or scanner on one or more of a surveillance system, a satellite, an aircraft and a television broadcast camera.

6. The system as recited in claim 2, wherein the encoding the message for visual display includes adjusting a resolution of the visual display to accommodate the reading device.

7. The system as recited in claim 1, wherein the processor is further configured for creating a short mail address by compressing to/from information into an indexed address format.

8. The system as recited in claim 1, wherein the processor is further configured for consolidating messages using a common template message list and encoding a plurality of messages into a single encoding.

9. The system as recited in claim 1, wherein the revealing the visual display includes employing a paper image to be captured by the reading device.

10. The system as recited in claim 1, wherein the processor is further configured for providing privacy by at least one of encrypting the message using a message key and a public key, and adjusting a length of an address.

11. A method for emergency communication, comprising:
    revealing a visual display, from a message encoded for visual display, to a reading device in communication with a broadcast center which stores the visual display;
    decoding and sorting messages from one or more visual displays at the broadcast center by collecting messages at the broadcast center and routing messages to revealed receivers; and
    broadcasting the message on a message channel, the message channel being configured to send the message to the revealed receivers for display using visible and non-visible light.

12. The method as recited in claim 11, further comprising encoding the message for visual display including a message-to field and a message-from field.

13. The method as recited in claim 11, further comprising broadcasting, on an index channel, a time and channel number for when the body of the message will be broadcast on the message channel.

14. The method as recited in claim 11, further comprising encoding the message for visual display by encoding the message in quick response code.

15. The method as recited in claim 11, wherein the revealing the message encoded for visual display to a reading device includes displaying the visual display to a camera or scanner on one or more of a surveillance system, a satellite, an aircraft and a television broadcast camera.

16. The method as recited in claim 12, wherein encoding the message for visual display includes adjusting a resolution of the visual display to accommodate the reading device.

17. The method as recited in claim 11, further comprising creating a short mail address by compressing to/from information into an indexed address format.

18. The method as recited in claim 11, further comprising consolidating messages using a common template message list and encoding a plurality of messages into a single encoding.

19. The method as recited in claim 11, wherein the broadcast center includes a network capable of operation during an emergency condition.

20. A computer program product comprising a non-transitory computer readable storage medium having program instructions embodied therewith, the program instructions executable by a computer to cause the computer to perform a method for emergency communication, comprising:

revealing a visual display, using a processor device, from a message encoded for visual display, to a reading device in communication with a broadcast center which stores the visual display;

decoding and sorting messages from one or more visual displays, using a second processor device, at the broadcast center by collecting messages at the broadcast center and routing messages to revealed receivers; and broadcasting, using the second processor, the message on a message channel, the message channel being configured to send the message to the revealed receivers for display using visible and non-visible light.

* * * * *